April 30, 1929. L. M. ASPINWALL 1,710,762
CONTROL SYSTEM
Filed Oct. 15, 1926 3 Sheets-Sheet 1

April 30, 1929.  L. M. ASPINWALL  1,710,762
CONTROL SYSTEM
Filed Oct. 15, 1926  3 Sheets-Sheet 3

INVENTOR
Louis M. Aspinwall.
BY
ATTORNEY

WITNESSES:

Patented Apr. 30, 1929.

1,710,762

UNITED STATES PATENT OFFICE.

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed October 15, 1926. Serial No. 141,720.

This invention relates generally to braking systems and particularly to regenerative braking systems for motor vehicles.

The object of the invention, generally stated, is the provision of a braking system that shall be simple and efficient in operation and readily and economically manufactured and installed.

A more specific object of the invention is to provide for the establishment of regenerative braking connections by the same handle that is utilized to effect the operation of a mechanical braking system.

A further object of the invention is to provide for checking the operation of the mechanical braking system of a motor vehicle for a period after its initiation, to permit the independent operation of a regenerative braking system, which may be caused to function by the initiation of the operation of the mechanical braking system.

Another object of the invention is to provide for the development of a predetermined voltage in a regenerative braking system, and the maintaining of the regenerated voltage substantially constant.

A still further object of the invention is to provide for the establishment of regenerative-braking connections for a motor by the actuation of a controller to its "on" and "off" positions successively, to permit the institution of regenerative braking upon the connection of the motors across the power source.

It is also an object of the invention to provide for the discontinuance of the regenerative braking of the motors of a vehicle and the operation of the mechanical braking system to permit the brakes to function when the vehicle has been decelerated to a predetermined speed.

Other objects of the invention will, in part, be obvious and will, in part, appear hereinafter.

The invention is disclosed in the embodiment thereof shown in the accompanying drawing and comprises the structural features, the combination of elements and the arrangement of parts, that will be exemplified in the structure hereinafter set forth, and the scope of the application of which will be indicated in the claims.

Figure 1:
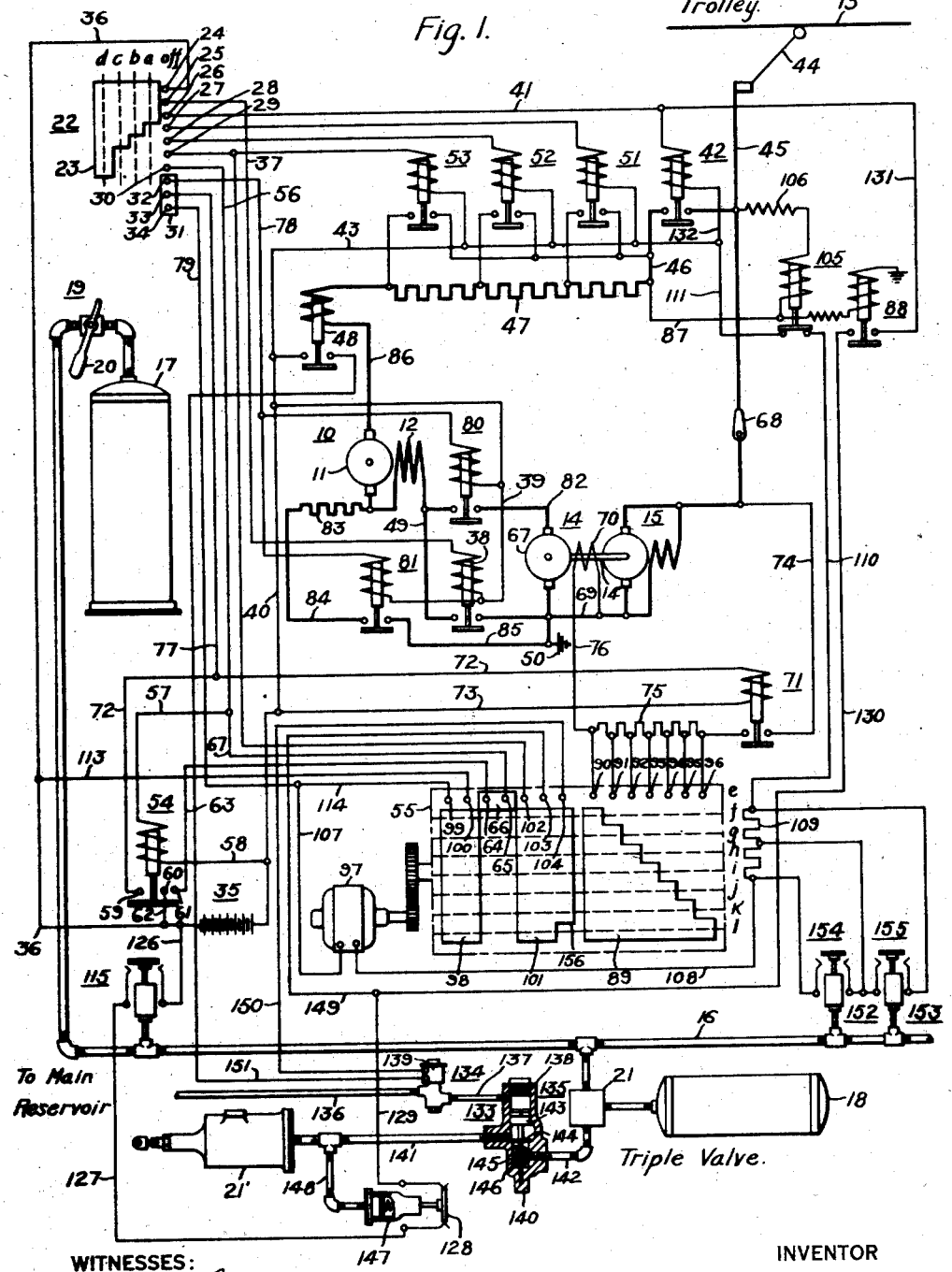
Figure 2:
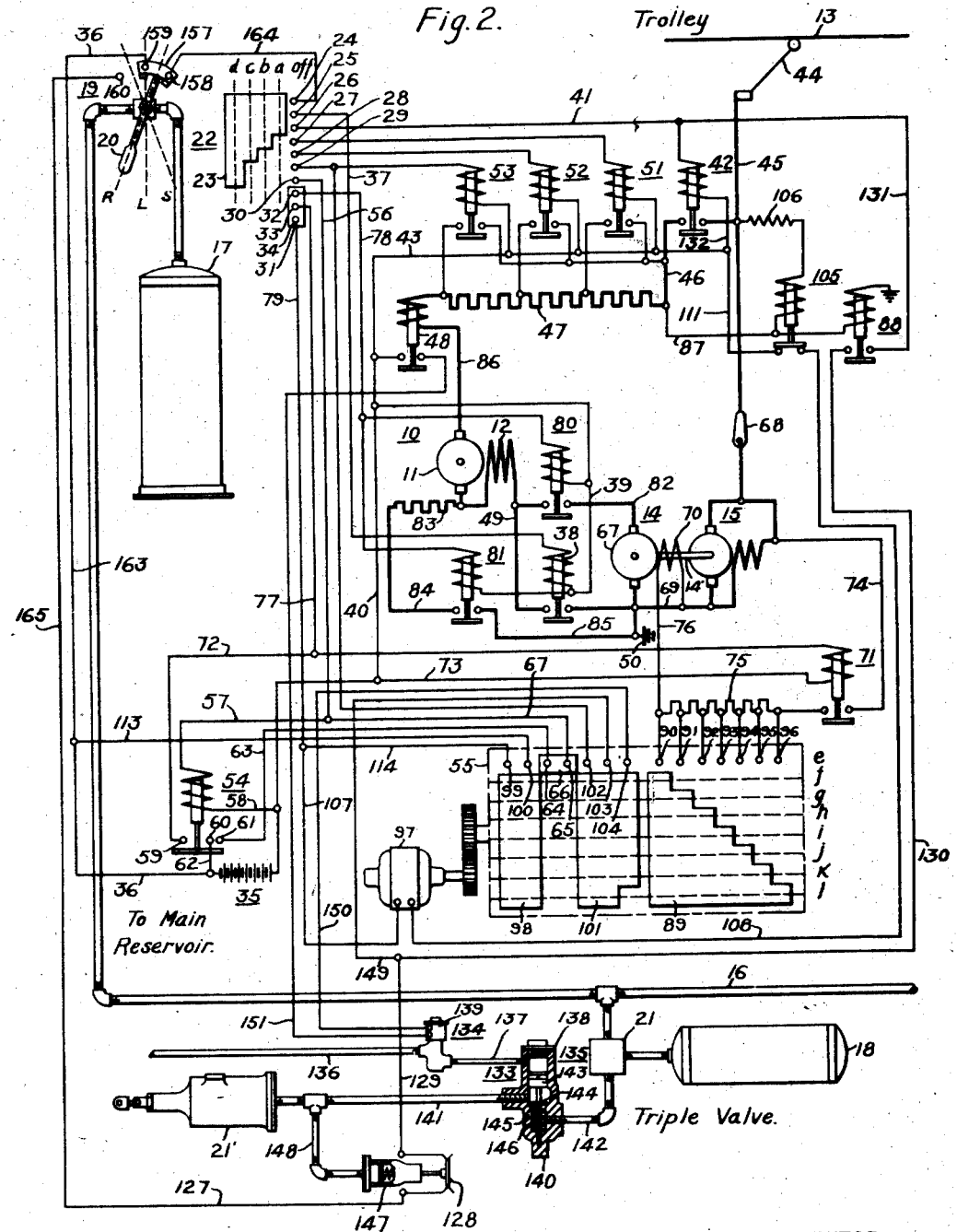
Figure 3:
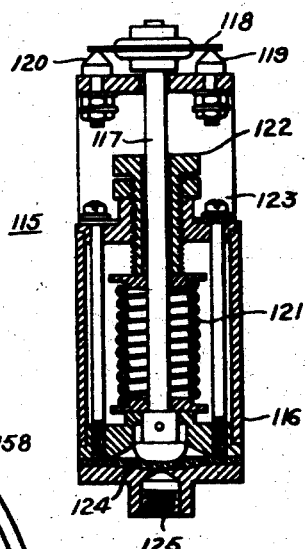
Figure 4:
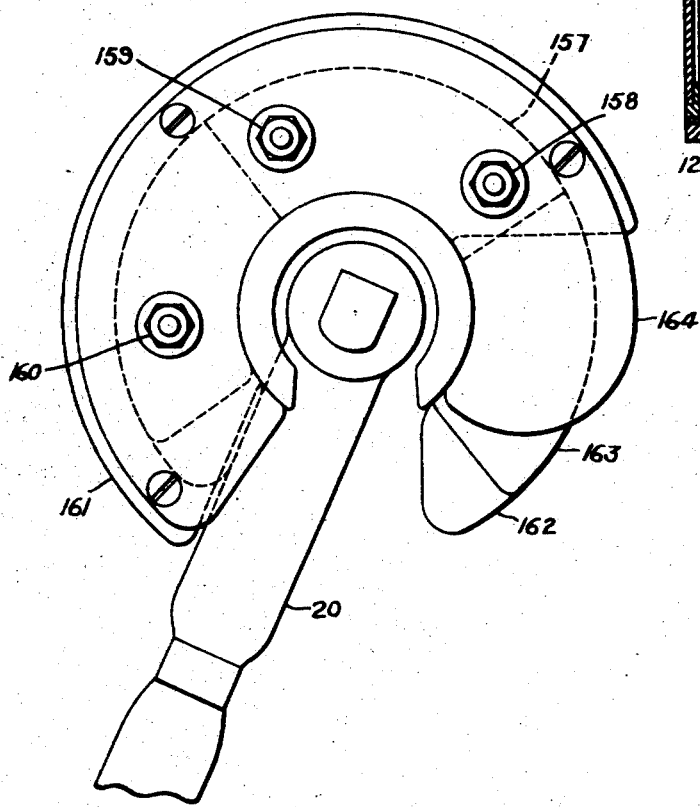

For a fuller understanding of the nature and objects of the invention, reference should be had to the following detailed description, taken in connection with the accompanying drawing, in which;

Fig. 1 is a diagrammatic view of a regenerative braking system constructed in accordance with this invention, Fig. 2 is a diagrammatic view of a modified form of the braking system, Fig. 3 is a vertical sectional view of an air-pressure-actuated contactor adapted for use in the braking system, and Fig. 4 is a top plan view of the brake lever used for initiating the operation of the mechanical braking system.

Referring now to the drawing, a motor 10 of any suitable type is employed for propelling a vehicle. In the particular system illustrated, a series motor having an armature winding 11 and a field winding 12, is shown as connected for energization from a trolley-conductor 13.

In order to energize the field windings of the motor 10, a motor-generator set including a generator 14 directly connected to a motor 15 is provided. The motor 15 is also energized from the trolley-conductor 13.

As is usual practice in motor driven vehicles, an air-brake system is provided for controlling the retardation of the vehicle. Since the construction and operation of air-brakes is widely understood, only a diagrammatic showing of the essential members is included in the drawing.

As illustrated, a train air line 16 is provided for conveying air from the main reservoir 17 to the auxiliary reservoir 18. In order to control the transfer of the air and the pressure in the train air line, an engineer's brake valve 19, disposed for actuation by a brake lever 20, and a triple valve 21, are utilized.

As in the commonly-used air-brake system, when the valve 19 is actuated and the main reservoir 17 is connected to the air line, the triple valve 21 functions to connect the auxiliary reservoir 18 to the train air line 16. Further, when the valve 19 is operated to disconnect the main reservoir 18 from the air line and reduce the pressure in the latter, the triple valve 21 functions to disconnect the auxiliary reservoir 18 from the train air line 16 and to connect it to the brake-shoe-actuating device 21'. Continued application of the brakes will reduce the pressure in the auxiliary reservoir 18, requiring that it be again connected to the main reservoir 17 to replenish the supply of air.

As will be readily understood, when only a mechanical braking system is employed, there is a great loss of energy every time a vehicle is slowed down in speed or brought to a stop. This statement is particularly true in the operation of subway and elevated electric trains, such as are commonly used in large cities.

In the present system for braking motor-driven vehicles, in the interest of economy in the use of electrical energy, a regenerative braking system is provided. The control of the regenerative braking system is facilitated by utilizing means for automatically effecting regenerative braking of a momentum-driven vehicle, upon the initiation of mechanical braking, and for terminating the functioning of the regenerative braking system and utilizing the mechanical braking system when the vehicle has been de-celerated to a predetermined speed.

In order to control the starting and acceleration of the motor 10, a master controller 22, which is provided with a contact segment 23 disposed to be set in a plurality of positions, "a" to "d" inclusive, is utilized. As shown, the contact segment is positioned to engage contact fingers 24 to 30, inclusive, as it is moved to its different positions. Further, an interlock 31 is provided on the controller to engage contact fingers 32 to 34, inclusive, when the controller is set in its "off" position.

Assuming now that the master controller 22 is actuated to set the contact segment 23 in its first position "a", where it engages contact fingers 24 to 26, inclusive, current flows from the battery 35 through conductor 36, contact fingers 24 and 25, bridged by contact segment 22, conductor 37, the actuating coil of switch 38, and conductors 39 and 40 to the battery. Another circuit extends from the contact finger 26, engaged by the contact segment 22, through conductor 41, the actuating coil of switch 42 and conductors 43 and 40 to the battery.

Therefore, switches 38 and 42 are closed and the circuit of the motor is established. Current now flows from the trolley-conductor 13 through trolley pole 44, conductor 45, switch 42, conductor 46, resistor 47, the actuating coil of relay 48, armature 11 and field winding 12 of the motor 10, conductor 49 and the switch 38 to the ground at 50.

In accelerating the motor 10, the master controller is actuated to positions "b", "c", and "d" successively, to energize the actuating coils of the switches 51, 52 and 53 to short-circuit the different sections of the resistor 47. In this manner, the motor is connected directly across the line and brought to its maximum speed.

In order to obtain the continuous functioning of the regenerative braking system in response to the actuation of the brake lever 20, provision is made for establishing, by the operation of the master controller, circuits that cooperate with the motor in developing a regenerated voltage that is greater than the line voltage. As will be explained hereinafter, when the controller 22 is thrown to its full "on" position and then to its "off" position, the motor 10 is connected for operation as a generator, and a suitable voltage is immediately developed thereby.

As will be observed, when the controller is actuated to position "d", it engages contact finger 30, and a circuit is established which extends therefrom through conductors 56 and 57, the actuating coil of the sequence relay 54, and conductor 58 to the battery 35. Therefore, the relay 54 is actuated and the contact fingers 59 to 61, inclusive, are bridged.

Upon the bridging of the contact fingers 61 to 59 inclusive, a holding circuit for the relay is established. As will be seen, the holding circuit extends from the battery 35 through conductor 62, contact fingers 60 and 61, bridged by relay 54, conductor 63, contact fingers 64 and 65, bridged by the contact segment 66 of the sequence drum 55, conductors 67 and 57, the actuating coil of relay 54 and conductor 58 to the battery. Therefore, the relay 54 is retained in its closed position after the controller is thrown to its "off" position.

It will be observed that the motor 15 of the motor-generator set may be connected to the source of supply by the closure of a manually operated switch 68. The energizing circuit for the motor 15 extends from the trolley-conductor 13 through the trolley pole 44, conductor 45, switch 68, and the armature and field windings of the motor 15 connected in parallel and conductor 69 to the ground at 50.

The generator 14 may be directly connected to the motor 15 in any suitable manner, as by a shaft 14', and may be set in operation whenever the motor 15 is connected to the power source by the closure of the manually operable switch 68. The energization of the field winding 70 of the generator is effected automatically connecting it across the main power source when the sequence relay 54 is closed.

The energizing circuit for the field winding 70 of the generator 14 is controlled by an electromagnetic switch 71. When the sequence relay 54 is closed, an actuating circuit for the switch 71 extends from the battery 35 through conductor 62, contact fingers 60 and 59, bridged by the movable contact member of the relay 54, conductor 72, the actuating coil of the switch 71, and conductor 73 to the battery.

As will be readily observed, when the switch 71 is closed, an energizing circuit for the field winding 70 is completed. This circuit extends from the trolley-conductor 13 through the trolley pole 44, conductor 45, switch 68, conductor 74, a resistor 75, conductor 76, the field winding 70 and conductor 69 to ground at 50.

Assume now that it is desired to de-celerate or stop a vehicle provided with the present control system and that the controller 22 is thrown to its "off" position. The actuation of the controller to its "off" position effects the establishment of the remaining circuits necessary for connecting the motor 10 to function as a generator.

As will be readily understood, when the master controller 22 is thrown to its "off" position, the actuating circuit of the line switch 42 is interrupted at the contact finger 26. Therefore the switch 42 is opened and the motor 10 is disconnected from the line.

As will be observed when the controller is set in its "off" position, the interlock 31 bridges the contact fingers 32 to 34, inclusive. A circuit now extends from the battery 35 through conductor 62, contact fingers 60 and 59, bridged by the movable contact member of the relay 54, conductors 72 and 77, and contact fingers 32 to 34, inclusive, bridged by the interlock 31, to conductors 78 and 79, thereby energizing conductors 78 and 79 for purposes to be set forth.

Two switch-actuating circuits are now completed from the energized conductor 78 through the parallel-connected actuating coils of the switches 80 and 81 and conductors 39 and 40 to the battery 35. The closure of the switches 80 and 81 serves to connect the armature 67 of the generator 14 across the field windings 12 of the motor 10, serving to excite the latter so that it may be operated as a generator when driven by the momentum of the vehicle.

It will be observed that the energizing circuit of the field winding 12 extends from the positive terminal of the armature 67 of the generator 14, through conductor 82, switch 80, the field winding 12, resistor 83, conductor 84, and switch 81 to the grounded side of the generator through conductor 85. Therefore the motor 10 will immediately begin to build up a generated voltage.

As soon as the motor 10 begins to function as a generator, current flows from the positive terminal of the armature 11, through conductor 86, the actuating coil of switch 48, resistor 47, conductor 87 and the actuating coil of a line switch relay 88. As is common practice in the construction of relays of this character, the relay is designed to function when subjected to a voltage of a predetermined value. Therefore, the line switch relay 88 will not close immediately upon the motor 10 being connected to operate as a generator.

In order to build up the voltage generator by the motor 10 to a value greater than that of the line voltage, provision is made for gradually excluding from the circuit the sections of the resistor 75, to increase the voltage of the generator 14 and thereby the excitation of the field winding 12 of the motor 10. The short-circuiting of the resistor sections is effected by means of a contact segment 89, carried by the sequence drum 55 and disposed to engage successively a plurality of contact fingers 90 to 96, inclusive, which are, in turn, connected to different points on the resistor 75.

The sequence drum 55 is disposed for operation by a pilot motor 97. As shown, the sequence drum is further provided with a contact segment 98, disposed to engage contact fingers 99 and 100, and a contact segment 101, which serves to bridge contact fingers 102, 103 and 104, thereby providing means for controlling the circuits.

In order to control the voltage built up by the motor 10, a polarized relay 105 is connected between the motor and the line conductor 13. As shown, the actuating circuit for the relay 105 extends from the motor through conductor 86, actuating coil of the relay 48, resistor 47, conductor 87, the actuating coil of the polarized relay 105, a high resistance 106 and conductors 45 and 44 to the positive line conductor 13.

The relay 105 is so constructed that it will not operate when current flows from the power source through it to the motor 10, but only when the voltage generated by the motor 10, operating as a generator, is greater than the line voltage, and current flows toward the power source. In this particular instance, the polarized relay 105 is adapted to function when the generated voltage is approximately 20 volts greater than that of the power source.

Simultaneously with the energization of the field winding 12 of the motor 10, a circuit is closed for operating the pilot motor 97. This motor circuit extends from the battery 35 through conductor 62, contact fingers 60 and 59, bridged by the relay 54, conductors 72 and 77, contact fingers 33 and 34, bridged by the interlock 31 carried by the master controller 22, conductors 79 and 107, motor 97, conductor 108, resistor 109, conductor 110, the movable contact member of polarized relay 105, and conductors 111 and 43 to the battery. Therefore, the sequence drum 55 begins to rotate forwardly through its different positions "e" to "l" inclusive. When the sequence drum moves from positive "e" to "f" the contact fingers 64 and 65 become disengaged from the contact segment 66, thereby breaking the holding circuit of the relay 54. Consequently, relay 54 drops to its lower position, and the motor circuit traced above is interrupted.

However, it will be observed that, before the contact fingers 64 and 65 become disengaged from the contact segment 66, the contact fingers 99 and 100 are engaged by contact segment 98. Therefore, another motor circuit is established extending from the battery 35 through conductors 36 and 113, contact fingers 100 and 99, bridged by the contact segment 98, conductors 114 and 107, motor 97, conductor 108, resistor 109, conductor 110, relay 105, and conductors 111 and 43 to the battery.

The pilot motor 97 continues to operate until the voltage of the motor 10, operating as a generator, is greater than the line voltage, when current flows through the relay 105 in the direction of the power source. The relay is thereupon raised and the circuit of the motor 97 is opened.

In the particular application of this invention disclosed in Fig. 1, when the generated voltage is approximately 20 volts higher than the voltage of the source of supply, the relay 105 is actuated to stop the motor 97 and thereby prevent further short-circuiting of the sections of the resistor 75. Thus, the relay functions to maintain the regenerated voltage substantially equal to the line voltage, to permit the starting of regenerative braking when the line switch is closed to connect the motor 10 to the trolley-conductor 13 to operate as a generator.

As the vehicle is de-celerated, the regenerated voltage decreases, and the relay 105 is de-energized and closed, thereby closing the pilot motor circuit. The sequence drum is immediately moved one step forward, excluding a section of the resistor 75 from the field circuit of the generator 14 to increase the excitation of the field winding 12 of the motor 10. The regenerated voltage is, therefore, increased, and the relay 105 is again actuated to open the circuit of pilot motor 97.

Should regenerative braking not be initiated, the step-by-step movement or nudging action of the sequence drum continues until the vehicle has de-celerated to a speed that is insufficient to cause the motor to build up a regenerated voltage that is greater than the line voltage.

The preceding description sets forth the preliminary regenerative braking circuits established upon the moving of the master controller 22 to its "full on" and "off" positions, successively. In order to permit the feeding of current back to the source of supply and thereby start regenerative braking, provision is made for actuating the line switch 42 upon the initiation of air-braking by the actuation of the brake lever 20.

With a view to connecting the motor 10 across the source of supply to deliver current to the trolley-conductors 13 when the regenerated voltage is greater than the line voltage, an air-pressure-actuated contactor 115 is connected in the train air line 16 and is disposed to close the actuating circuit of the switch 42. The construction of the contactor 115 will be readily understood by reference to Fig. 3.

As shown, the contactor comprises a casing 116 in which a plunger 117 is slidably mounted. In this particular construction, a contact plate 118 is mounted on the upper end of the plunger 117 and is disposed to engage contact members 119 and 120, which are positioned on the upper end of the casing.

In order to normally retain the contact plate 118 in engagement with the contact members 119 and 120, a coil spring 121 is disposed between the head of the plunger and a sleeve 122, adjustably mounted in a partition 123 provided in the casing 116.

A diaphragm 124 is located in the bottom of the casing 116 to receive the head of the plunger 117. An opening 125 is formed in the end of the casing 116 to admit a compressed fluid, such as compressed air, for the purpose of flexing the diaphragm to actuate the plunger 117 and thereby disengage the plate 118 from the contact members 119 and 120.

It will be readily understood that the spring 121 may be made of any desired strength and subjected to any predetermined pressure by means of the adjustable sleeve 122. Therefore, when the proper spring has been selected and adjusted, the contact plate 118 may be raised to its upper position by subjecting the diaphragm 124 to a predetermined pressure. Thus, engagement between the plate 118 and the contact members 119 and 120 may be effected by a predetermined reduction of the air pressure as, for example, by five or ten pounds.

As illustrated, the contactor 115 is connected to the train air line and its operation may be effected by changing the pressure in the train air line. Accordingly, the contactor is responsive to movements of the engineer's brake valve, which is disposed to change the pressure in the air line, in accordance with a familiar practice.

Assume now that the contactor 115 is adapted to drop the contact plate 118 into engagement with the contact members 119 and 120 when the pressure in the train air line 16 has been reduced approximately five pounds. Therefore, upon operation of the engineer's brake valve to initiate air braking, a circuit is established which extends from the battery 35, through conductor 126, contactor 115, conductor 127, contact plate 128, conductors 129 and 130, the line-switch relay 88, conductor 131, the actuating coil of the line switch 42, and conductor 132, 43 and 40 to the battery.

In order to check the operation of the airbrake system, after its initiation by the actuation of the engineer's brake valve to reduce the pressure in the train air line, a system of valves shown generally at 133 is provided for preventing the discharge of air from the auxiliary brake cylinder 18 to the brakeshoe-actuating device 21' until after the regenerative braking has been discontinued.

The system of valves provided for checking the operation of the air-brake system includes an electromagnetically operated valve 134 and a valve 135 adapted for operation by air pressure. As shown, the valve 134 is connected by a pipe line 136 to the main reservoir and by a pipe line 137 to the upper end of the cylinder 138 of the valve 135.

The valve 134 may be of any suitable electromagnetically operated type. In this particular construction, an actuating coil 139 functions when energized to open the valve 134.

As illustrated, the valve 135 comprises a casing 140, on the upper end of which is formed the cylinder 138. In addition to the connection to the valve 134, the valve 135 is provided with two other connections: pipe 141, which leads to the brake-shoe-actuating device 21' and pipe 142 extending to the triple valve 21.

Slidably mounted in the cylinder 138 is a piston 143, carrying the valve member 144. As will be observed, the lower end of the valve member, which is disposed to be positioned in the valve seat 145, is considerably smaller in area than the upper end of the piston 143. Therefore, compressed air admitted through the pipe 137 will serve to maintain the valve member 144 in its lower position against the pressure of air admitted through the pipe 142, even if the pressure on the lower face of the valve member is of a greater number of pounds to the square inch. In the construction illustrated, a spring 146 is provided to aid in the unseating of the valve member 144.

In order to actuate the contact plate 128 to break the above-traced circuit connected therethrough when air braking occurs, a cylinder 147, which is substantially similar to the brake-shoe-actuating device 21', is provided. As is usual practice in structures of this type, a piston is slidably mounted in a cylinder and is biased toward the base by a spring. On the admission of compressed air through the connector 141 leading to the brake-shoe-actuating device 21', air is admitted through the pipe 148 to the cylinder 147, and the piston is actuated to project the plate 128 outwardly, thereby breaking the associated electric circuit.

As a result of the actuation of the brake valve 19 to reduce the pressure in the train air line to operate the contactor 115, another circuit is set up that serves to effect the checking of the operation of the air-brake system. This circuit may be traced from the battery 35, through conductor 126, contactor 115, conductor 127, contact plate 128, conductors 129 and 149, contact fingers 103 and 104, bridged by the contact segment 101 of sequence drum 55, conductor 150, the actuating coil 139 of valve 134, conductor 151, relay 48 and conductor 40 to the battery.

It will be readily understood that, when the valve 134 is opened, pressure is admitted to the cylinder 138 through the valve 135. Therefore, the connection between the pipe lines 142 and 141, extending between the triple valve 21 and the brake-shoe-actuating device 20', is cut off by the valve member 144, which is projected to its lower position by the air pressure from the main reservoir that is applied to the piston 143.

Two other contactors 152 and 153 are connected in the train air line 16. As will be observed, the contact plates 154 and 155, carried by the contactors 152 and 153, respectively, are disposed to short-circuit two sections of the resistor 109. In setting these contactors 152 and 153, provision may be made for their operation upon the reduction of pressure in the train air line 16 by any desired amount such, for example, as ten and fifteen pounds, respectively. Thus, when the brake valve 19 is operated to reduce the air pressure in three different stages at the rate of five pounds each time, the contactors 115, 152 and 153 are actuated successively. However, if the pressure is reduced by fifteen pounds upon the first movement of the brake valve, the three contactors are closed simultaneously.

It will be readily understood that the speed of the motor 97 may be controlled by means of the resistor 109 in circuit therewith. Further, the speed of the sequence drum 55 and, therefore, the building up of the regenerative voltage may be varied by controlling the speed of the motor 97. Accordingly, it may be said that the rate of regenerative braking may be controlled by means of contactors 152 and 153.

The contact segment 101 is notched, as shown at 156, so that, when the sequence drum reaches position "7", corresponding to a relatively low speed of the vehicle, the contact finger 104 is disengaged, and the actuating circuit for the valve 134 is interrupted. Immediately, the valve 134 cuts off the supply of air through the pipe 136 to the cylinder 138, thereby permitting the actuation of the valve member 144 to its upper position and the connection of the auxiliary reservoir 18 through the triple valve 21 to the brake-shoe-actuating device 21'.

Therefore, when the sequence drum completes one revolution, the regenerative braking system circuits, and any preliminary circuits that may have been established for regenerative braking, are interrupted, and the air-braking system is permitted to function. Further, as long as the air-braking system continues to function, the circuits required for effecting regenerative braking cannot be re-established.

If, at any time during the operation of the regenerative braking system, the pressure in the cylinder 147 becomes great enough to actuate the plate 128 to interrupt the circuit in which it is connected, the regenerative braking operations are discontinued and the air-brake system is set in operation.

As hereinbefore described, an actuating circuit for the relay 48 is established when the motor 10 is connected to function as a generator. Further, it will be observed that the relay 48 serves to control the actuating circuit for the valve 134.

Assume now that the engineer's brake valve 19 is operated to effect a braking action and that, for some reason, the regenerative braking system fails to respond. Under such conditions, the relay 48 is not closed, and the valve 134 remains closed, thereby permitting the normal functioning of the air-brakes in response to the operation of the engineer's brake valve.

A modification of a braking system is illustrated in Fig. 2. As will be observed, a contact segment 157, disposed for actuation by the engineer's brake lever 20 to engage contact fingers 158 to 160, inclusive, in pairs, is provided instead of the contactor 115.

The construction of the device actuated by the engineer's brake lever is best shown in Fig. 4. As illustrated, a casing 161, adapted to be mounted on the engineer's brake valve, has mounted therein a substantially U-shaped slider 162, which may be made from any suitable material such, for example, as steel. The slider 162 has mounted thereon, a contact segment 157, which is disposed to engage in pairs the resiliently mounted contact fingers 158 to 160, inclusive, when the slider is set at the limits of its angular movement. As shown, the contact segment 157 is insulated from the slider 162 by the insulating plate 163.

In this construction, the contact fingers 158 to 160, inclusive, are mounted to depend from the casing 164, which is preferably made from insulating material, thereby making it unnecessary to insulate each contact finger separately.

In order to actuate the slider 162 to give the desired connections, the engineer's brake valve handle is disposed between its ends. As will be observed, a certain amount of lost motion is permitted when the brake lever is being actuated from its "release" position to its "service" position, thereby permitting the brake lever to be set in its "lap" position without changing the circuits established by setting the lever in its release position.

The operation of the regenerative braking system illustrated in Fig. 2 is exactly the same as that described for the braking system illustrated in Fig. 1, with respect to the means provided for controlling the operation of the line switch 42, and the starting of the sequence switch motor 97, after the initiation of air-braking by the operation of the engineer's brake valve 19. Accordingly, it is thought that it will be sufficient, for the purposes of this specification, to merely point out the manner in which the valve 134 may be controlled by the operation of the brake lever 20.

When the brake lever 20 is thrown to its "release" position, the contact segment 157 is moved to engage the contact fingers 158 and 159. The battery 35 is then connected through conductors 36 and 163, contact fingers 159 and 158, bridged by the contact segment 157, and conductor 164 to the contact finger 24. Therefore, it will be readily understood that, upon the actuation of the master controller 22 of the system shown in Fig. 2 the desired main circuits may be set up for starting and accelerating the motor 10, and for establishing the same group of auxiliary circuits that are closed by the actuation of the controller 22 to its "on" and "off" positions in the system illustrated in Fig. 1.

Assume now that it is desired to utilize the regenerative braking system and that the controller 22 is thrown to its "off" position to complete the establishment of the circuits necessary for regenerative braking. In order to close the line switch 42 to permit the feeding of current to the source of power supply, the engineer's brake valve 19 is actuated to initiate the operation of the air-brake system. The throwing of the brake lever 20 to "service" position moves the contact segment 157 into engagement with the contact fingers 159 and 160.

In this manner, a circuit is established from the battery 35 through conductors 36 and 163, contact fingers 159 and 160, bridged by the contact segment 157, conductors 165 and 127, contact plate 128, conductors 129 and 130, relay 88, conductor 131, the actuating coil of the line switch 42, and conductors 132, 43 and 40 to the battery 35. Therefore, the switch 42 is closed to connect the motor 10 to the trolley-conductor 13. After the preliminary circuits for regenerative braking have been established by the manipulation of the master controller 22, regenerative braking will be instituted upon the closing of the line switch 42.

In order to simplify the drawings and to curtail the description, the system has been restricted to a single motor, but it will be readily understood that, in practice, two or more motors may be used and that these motors may be grouped in any desired relations, such as series or parallel, in a manner that is well understood in the art.

Since certain changes may be made in the above-described construction, and different embodiments of the invention may be made without departing from the scope thereof, it is intended that all matter contained in the above description, or shown in the accompanying drawing, shall be interpreted as illustrative and not in a limiting sense.

I claim as my invention:

1. In a control system, a momentum-driven motor, an air-brake system, means for controlling the operation of the air-brake system, means disposed for actuation by the brake-control means to effect regenerative braking, and means for checking the functioning of the air-brake system after the initial operation of said brake control means.

2. In a control system for motor vehicles, in combination, a motor disposed to be driven by the momentum of a vehicle, a mechanical braking system for the vehicle, a brake lever for initiating the operation of the mechanical braking system, means disposed for operation by the brake lever for connecting the motor to effect regenerative braking, and means for checking the functioning of the mechanical braking system after the initial operation of the lever.

3. In a control system for motor vehicles, in combination, a motor for propelling a vehicle, said motor being disposed for operation by the momentum of the vehicle, a controller for starting and accelerating the motor, and means co-operative with the controller as it is thrown to its "on" and "off" positions, successively, to connect the motor for operation as a generator.

4. In a control system for motor vehicles, in combination, a motor for propelling a vehicle, said motor being disposed for operation by the momentum of the vehicle, a controller for starting and accelerating the motor, means co-operative with the controller as it is thrown to its "on" and "off" positions, successively, to connect the motor for operation as a generator, a mechanical braking system, means for initiating the operation of the braking system, and means operated by the brake-control means for establishing connections to effect regenerative braking.

5. In a control system for motor vehicles, in combination, a motor for propelling a vehicle, said motor being disposed for operation by the momentum of the vehicle, a controller for starting and accelerating the motor, means co-operative with the controller as it is thrown to its "on" and "off" positions, successively, to connect the motor for operation as a generator, a mechanical braking system, means for initiating the operation of the braking system, means operated by the brake-control means for establishing connections to effect regenerative braking, and means for checking the operation of the mechanical braking system.

6. In a control system, in combination, a momentum-driven motor, means disposed to co-operate with the motor to effect regenerative braking, a mechanical braking system, means for controlling the operation of the mechanical braking system, and means actuated upon the initiation of the operation of the mechanical braking system to effect regenerative braking.

7. In a control system, in combination, a momentum-driven motor, means disposed to co-operate with the motor to effect regenerative braking, a mechanical braking system, means for controlling the operation of the mechanical braking system, means actuated upon the initiation of the operation of the mechanical braking system to effect regenerative braking, and means for checking the operation of the mechanical braking system to permit independent regenerative braking.

8. In a control system, in combination, a momentum-driven motor, means disposed to co-operate with the motor to effect regenerative braking, a mechanical braking system, means for controlling the operation of the mechanical braking system, means actuated upon the initiation of the operation of the mechanical braking system to effect regenerative braking, means for checking the operation of the mechanical braking system to permit independent regenerative braking, and means for interrupting the operation of the means provided for checking the operation of the mechanical braking system.

9. In a control system for motor vehicles, in combination, a propelling motor disposed to be driven by the momentum of the vehicle, a source of supply of electrical energy for the motor, a controller for connecting the motor to the source of supply, means for connecting the motor to function as a generator when the controller is thrown to its "on" and "off" positions successively, a mechanical braking system for the vehicle, and means actuated by the initiation of the operation of the mechanical braking system to connect the motors across the source of supply to effect regenerative braking.

10. In a control system for motor vehicles, in combination, a propelling motor disposed to be driven by the momentum of the vehicle, a source of supply of electrical energy for the motor, a controller for connecting the motor to the source of supply, means for connecting the motor to function as a generator when the controller is thrown to its "on" and "off" positions successively, a mechanical braking system for the vehicle, means actuated by the initiation of the operation of the mechanical braking system to connect the motor across the source of supply to effect regenerative braking, and means for maintaining the voltage developed by the regenerative system substantially equal to the line voltage.

11. In a control system for motor vehicles, in combination, a propelling motor disposed to be driven by the momentum of the vehicle, a source of supply of electrical energy for the motor, a controller for connecting the motor to the source of supply, means for connecting the motor to function as a generator when the controller is thrown to its "on" and "off" positions successively, a mechanical braking system for the vehicle, and means actuated by the initiation of the operation of the mechanical braking system to connect the motors across the source of supply to effect regenerative braking, said connecting means being adapted to interrupt the regenerative connections when the voltage of the regenerative system becomes lower than the voltage of the source of supply.

12. In a control system for motor vehicles, in combination, a propelling motor disposed to be driven by the momentum of a vehicle, a source of supply of electrical energy for the motor, a controller for connecting the motor to the source of supply, means for connecting the motor to function as a generator when the controller is thrown to its "on" and "off" positions successively, a mechanical braking system for the vehicle, and means dependent upon the initiation of the mechanical braking for automatically making and breaking connections between the source of supply and the motor according as the regenerative voltage is greater or less than the supply voltage.

13. In a control system for motor vehicles, in combination, a propelling motor disposed to be driven by the momentum of a vehicle, a source of supply of electrical energy for the motor, a controller for connecting the motor to the source of supply, means for connecting the motor to function as a generator when the controller is thrown to its "on" and "off" positions successively, a mechanical braking system for the vehicle, means dependent upon the initiation of the mechanical braking for automatically making and braking connections between the source of supply and the motor according as the regenerative voltage is greater or less than the supply voltage, and means independent of the mechanical braking system adapted to prevent mechanical braking during regenerative braking.

14. In a control system for motor vehicles, in combination, a propelling motor disposed to be driven by the momentum of a vehicle, a source of supply of electrical energy for the motor, a controller for connecting the motor to the source of supply, means for connecting the motor to function as a generator when the controller is thrown to its "on" and "off" positions successively, a mechanical braking system for the vehicle, means dependent upon the initiation of the mechanical braking for automatically making and braking connections between the source of supply and the motor according as the regenerative voltage is greater or less than the supply voltage, means independent of the mechanical braking system adapted to prevent mechanical braking during regenerative braking, and means for releasing said preventive means to permit the functioning of the mechanical braking system.

15. In a control system, in combination, a momentum-driven motor, means for effecting mechanical braking, means for effecting regenerative braking, and means automatically operable upon the initiation of the mechanical braking to check the mechanical braking operation, and to effect regenerative braking.

16. In a control system, in combination, a momentum-driven motor, means for effecting mechanical braking, means for effecting regenerative braking, means automatically operable upon the initiation of the mechanical braking to check the mechanical braking operation and to effect regenerative braking, and means for subsequently interrupting the operation of the regenerative braking means to permit the operation of the mechanical braking means.

17. In a control system, in combination, a momentum-driven motor, means for effecting mechanical braking, means for effecting regenerative braking, means automatically operable upon the initiation of the mechanical braking to check the mechanical braking operation and to effect regenerative braking, and means for controlling the voltage of the regenerative braking means to maintain it above a predetermined value.

18. In a control system for motor vehicles, in combination, a motor disposed to be driven by the momentum of the vehicle, an air-brake system provided with an air line for braking the vehicle, a regenerative braking system, and means actuated by change of pressure in the air line to check the operation of the air-brake system, and to effect regenerative braking.

19. In a control system for motor vehicles, in combination, a momentum-driven vehicle an air-brake system provided with a train air line, and means dependent upon the pressure in the train air line for effecting regenerative braking.

20. In a control system for motor vehicles, in combination, a momentum-driven vehicle, an air-brake system provided with a train air line, and means actuated by a change of pressure in the train air line disposed to effect regenerative braking.

21. In a control system for motor vehicles, in combination, a momentum-driven vehicle, an air-brake system provided with a train air line, means dependent upon the pressure in the train air line for effecting regenerative braking, and means for varying the rate of regenerative braking.

22. In a control system for motor vehicles, in combination, a momentum-driven vehicle, an air-brake system provided with a train air line, means for reducing the pressure in the train air line step-by-step to effect regenerative braking and means actuated by changes in pressure in the train air line for varying the rate of regenerative braking.

23. In a control system, in combination, a motor-driven vehicle, an air-brake system for the vehicle, a regenerative braking system and a common control lever for the braking systems.

24. In a control system, in combination, a motor-driven vehicle, an air-brake system for the vehicle, a regenerative braking system, a common control lever for the braking systems, and means responsive to the operation of the control lever for checking the action of the air braking system to permit the functioning of the regenerative braking system.

25. In a control system, in combination, a motor-driven vehicle, an air-brake system for the vehicle, a regenerative braking system, a common control lever for the braking systems, means responsive to the operation of the control lever for effecting the initiation of regenerative braking and checking the action of the air-braking system to permit the independent functioning of the regenerative braking system, and means for maintaining the regenerated voltage substantially constant.

26. In a control system, in combination, a motor-driven vehicle, an air-brake system, a regenerative braking system, means for controlling the operation of the air-brake system, and means automatically operable upon the actuation of said control means for checking the operation of the air-brake system and causing the regenerative braking system to function.

27. In a control system, in combination, a motor-driven vehicle, an air-brake system, a regenerative braking system, means for controlling the operation of the air-brake system, means automatically operable upon the actuation of said control means for checking the operation of the air-brake system and causing the regenerative braking system to function, and means co-operative to maintain the regenerated voltage substantially constant.

28. In a control system, in combination, a motor-driven vehicle, an air-brake system, a regenerative braking system, means for controlling the operation of the air-brake system, means automatically operable upon the actuation of said control means for checking the operation of the air-brake system and for causing the regenerative braking system to function, and means for interrupting the operation of the regenerative braking system to permit the air-brake system to function.

29. In a control system, in combination, a motor-driven vehicle, an air-brake system, a regenerative braking system, means for controlling the operation of the air-brake system, means automatically operable upon the actuation of said control means to initiate regenerative braking and to check the operation of the air-brake system and to cause the regenerative braking system to function, means co-operative to maintain the regenerated voltage substantially constant, and means for interrupting the operation of the regenerative braking system to permit the air-brake system to function.

30. In a control system, in combination, a momentum-driven vehicle, an air-brake system for controlling the movements of the vehicle, a valve system for checking the operation of the air-brake system, a control lever for the air-brake system, a regenerative braking system, and means adapted to function upon the operation of the brake lever to govern the valve system to check the operation of the air-brake system and thereby to permit the regenerative braking system to operate independently.

31. In a control system, in combination, a momentum-driven vehicle, an air-brake system for controlling the movements of the vehicle, a valve system for checking the operation of the air-brake system, a control lever for the air-brake system, a regenerative braking system, means adapted to function upon the operation of the brake lever to govern the valve system to check the operation of the air brake system thereby to permit the regenerative braking system to function independently, and means for maintaining the voltage of the regenerative braking system substantially constant.

32. In a control system, in combination, a momentum-driven vehicle, an air-brake system for controlling the movements of the vehicle, a valve system for checking the operation of the air-brake system, a control lever for the air-brake system, a regenerative braking system, means adapted to function upon the operation of the brake lever to govern the valve system to check the operation of the air brake system thereby to permit the regenerative braking system to function independently, means for maintaining the voltage of the regenerative braking system substantially constant, and means for interrupting the operation of the regenerative braking system to permit the air-brake system to function.

33. In a control system, in combination, a momentum-driven vehicle, an air-brake system for controlling the movements of the vehicle, a valve system for checking the operation of the air-brake system, a control lever for the air-brake system, a regenerative braking system, means adapted to function upon the operation of the brake lever to govern the valve system to check the operation of the air-brake system and thereby to permit the regenerative braking system to function separately, and means for controlling the rate of regenerative braking.

34. In a control system, in combination, a momentum-driven vehicle, an air-brake system for controlling the movements of the vehicle, brake-control means for initiating the operation of the air-brake system, a regenerative braking system, and means dependent upon the development of a regenerated current for checking the operation of the air-brake system to permit the functioning of the regenerative braking system.

35. In a control system, in combination, a momentum-driven vehicle, an air-brake system for controlling the movements of the vehicle, brake-control means for initiating the operation of the air-brake system, a regenerative braking system, means dependent upon the development of a regenerated current for checking the operation of the air-brake system to permit the functioning of the regenerative braking system, and means co-operative to maintain the regenerated voltage constant.

36. In a control system, in combination, a momentum-driven vehicle, an air-brake system for controlling the movements of the vehicle, brake control means for initiating the operation of the air-brake system, a regenerative braking system, means dependent upon the development of a regenerated current for checking the operation of the air-brake system to permit the functioning of the regenerative braking system, and means for interrupting the operation of said checking means.

37. In a control system for motor-driven vehicles, in combination, an air-brake system, a regenerative braking system, means for initiating the operation of the air-brake system, and means for checking the operation of the air-brake system and causing the regenerative braking system to function, said checking means being adapted to maintain the air-brake system inoperative for a predetermined period if the regenerative system continues to function.

38. In a control system for motor-driven vehicles, in combination, an air-brake system, a regenerative braking system, means for initiating the operation of the air-brake system, means for checking the operation of the air-brake system and causing the regenerative braking system to function, said checking means being adapted to maintain the air-brake system inoperative for a predetermined period if the regenerative system continues to function, and means for maintaining the regenerated voltage substantially constant for different speeds of the vehicle.

39. In a control system, in combination, a momentum driven vehicle, an air-brake system for the vehicle, a regenerative braking system, and means for checking the action of the air-brake system during the functioning of the regenerative braking system, said checking means being adapted to permit the operation of the air-brake system when the regenerative braking system ceases to function.

40. In a control system, in combination, a momentum driven vehicle, an air-braking system for the vehicle, a regenerative braking system, common control means for said braking systems, and means responsive to the actuation of the control means for initiating regenerative braking and checking the functioning of the air-brake system, said checking being adapted to remain inoperative if the regenerative braking system fails to function.

In testimony whereof, I have hereunto subscribed my name this 9th day of October, 1926.

LOUIS M. ASPINWALL.